US009726804B2

United States Patent
Wu

(10) Patent No.: US 9,726,804 B2
(45) Date of Patent: Aug. 8, 2017

(54) LIGHT GUIDE PLATE AND METHOD OF MANUFACTURING THE SAME, AND BACKLIGHT MODULE

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 161 days.

(21) Appl. No.: 14/498,313

(22) Filed: Sep. 26, 2014

(65) Prior Publication Data
US 2015/0369999 A1   Dec. 24, 2015

(30) Foreign Application Priority Data

Jun. 19, 2014   (CN) .......................... 2014 1 0276937

(51) Int. Cl.
*F21V 8/00* (2006.01)
*G02B 6/00* (2006.01)

(52) U.S. Cl.
CPC ......... *G02B 6/0036* (2013.01); *G02B 6/0031* (2013.01); *G02B 6/0018* (2013.01); *G02B 6/0043* (2013.01); *G02B 6/0065* (2013.01)

(58) Field of Classification Search
CPC .. G02B 6/0035; G02B 6/0076; G02B 6/0018; G02B 6/0025; G02B 6/0031; G02B 6/0065
See application file for complete search history.

(56) References Cited

U.S. PATENT DOCUMENTS

| 6,445,430 B1* | 9/2002 | Sakamoto | G02B 6/0021 349/58 |
|---|---|---|---|
| 2009/0195729 A1* | 8/2009 | Little | G02B 6/0053 349/64 |

(Continued)

FOREIGN PATENT DOCUMENTS

| CN | 1566996 A | 1/2005 |
|---|---|---|
| CN | 101334551 A | 12/2008 |

(Continued)

OTHER PUBLICATIONS

First Chinese Office Action dated May 3, 2016, for corresponding Chinese Application No. 201410276937.1.

(Continued)

*Primary Examiner* — Karabi Guharay
(74) *Attorney, Agent, or Firm* — Kinney & Lange, P.A.

(57) ABSTRACT

A light guide plate and a method of manufacturing the same, and a backlight module, are disclosed. The light guide plate comprises: a transparent substrate having a light emergence face, a bottom face opposite to the light emergence face, and a plurality of side faces connecting and perpendicular to the light emergence face and the bottom face; and a scattering layer and a first reflective film layer, wherein the scattering layer is formed on the light emergence face of the transparent substrate and the first reflective film layer is formed on the bottom face of the transparent substrate, or the scattering layer is formed on the bottom face of the transparent substrate and the first reflective film layer is formed on the scattering layer.

1 Claim, 4 Drawing Sheets

(56) References Cited

U.S. PATENT DOCUMENTS

| | | | | |
|---|---|---|---|---|
| 2011/0176089 A1* | 7/2011 | Ishikawa | ............ | G02B 6/0018 |
| | | | | 349/65 |
| 2011/0255835 A1* | 10/2011 | Yagi | .................... | G02B 6/0011 |
| | | | | 385/129 |
| 2012/0026429 A1* | 2/2012 | Chen | ...................... | G02B 6/004 |
| | | | | 349/65 |
| 2012/0287369 A1* | 11/2012 | Tsuji | ................... | G02B 6/0031 |
| | | | | 349/58 |
| 2012/0320628 A1* | 12/2012 | Chang | ................. | G02B 6/0025 |
| | | | | 362/609 |

FOREIGN PATENT DOCUMENTS

| | | |
|---|---|---|
| CN | 101620290 A | 1/2010 |
| CN | 202494798 U | 10/2012 |
| JP | H09183920 A | 7/1997 |

OTHER PUBLICATIONS

Second Chinese Office Action dated Oct. 17, 2016, for corresponding Chinese Application No. 201410276937.1.
Third Chinese Office Action, for Chinese Patent Application No. 201410276937.1, dated Jan. 22, 2017, 30 pages.

* cited by examiner

LIGHT GUIDE PLATE AND METHOD OF MANUFACTURING THE SAME, AND BACKLIGHT MODULE

CROSS-REFERENCE TO RELATED APPLICATION

This application claims the benefit of Chinese Patent Application No. 201410276937.1 filed on Jun. 19, 2014 in the State Intellectual Property Office of China, the whole disclosure of which is incorporated herein by reference.

BACKGROUND OF THE INVENTION

Field of the Invention

Embodiments of the present invention generally relate to display technique field, and in particular, to a light guide plate and a method of manufacturing the same, and a backlight module comprising the light guide plate.

Description of the Related Art

With a booming development of the Optoelectronics Industry, a liquid crystal display (LCD) has been widely applied in various electrical products. A picture can only be displayed on the liquid crystal display by using a surface light source provided by a backlight module. Thus, the backlight module is an indispensable and important part of the liquid crystal display.

FIG. 1 is a schematic structural diagram showing a backlight module in prior arts. The backlight module 100 comprises a light guide plate 101, an optical film sheet 102 provided on a side of a light emergence face of the light guide plate 101, a reflective sheet 103 provided on a side of a bottom face of the light guide plate 101, a bottom plate 104 for protecting the above configuration, and a light source 105. Light provided by the light source 105 is incident into the light guide plate 101 from the light incidence face thereof, forms a surface light source in the light guide plate 101, and is emitted from the light emergence face of the light guide plate 101, while light emerging from the bottom face is reflected back into the light guide plate 101 by the reflective sheet 103. The bottom plate 104 is used to protect the above reflective sheet 103, the light guide plate 101 and the optical film sheet 102.

The prior art backlight module comprises a plurality of independent parts and thus is relatively complex in structure, resulting in a higher production cost. Further, each of the plurality of independent parts has a prescribed thickness, and usually, there are assembly clearances between the adjacent parts, resulting in that a whole thickness of the backlight module is larger, and that there is a greater limitation in manufacturing a relatively thin display.

SUMMARY OF THE INVENTION

An object of the present invention is to provide a light guide plate and a method of manufacturing the same, and a backlight module comprising the light guide plate, in order to solve at least one aspect of the problems in the conventional backlight module, such as a complex structure, a high production cost, and a larger thickness.

According to one aspect of embodiments of the present invention, there is provided a light guide plate comprising: a transparent substrate having a light emergence face, a bottom face opposite to the light emergence face, and a plurality of side faces connecting and perpendicular to the light emergence face and the bottom face; and a scattering layer and a first reflective film layer, wherein the scattering layer is formed on the light emergence face of the transparent substrate and the first reflective film layer is formed on the bottom face of the transparent substrate, or the scattering layer is formed on the bottom face of the transparent substrate and the first reflective film layer is formed on the scattering layer.

According to another aspect of embodiments of the present invention, there is provided a backlight module comprising a light source and the light guide plate as describe above, the light source is provided at a side of at least one side face of the plurality of side faces of the transparent substrate, and light emitted by the light source is incident into the light guide plate from the at least one side face.

According to a further aspect of embodiments of the present invention, there is provided a method of manufacturing a light guide plate, comprising steps of: providing a transparent substrate, which has a light emergence face, a bottom face opposite to the light emergence face, and a plurality of side faces connecting and perpendicular to the light emergence face and the bottom face; and forming a scattering layer on the light emergence face of the transparent substrate, and forming a first reflective film layer on the bottom face of the transparent substrate; or, forming the scattering layer on the bottom face of the transparent substrate, and forming the first reflective film layer on the scattering layer.

DETAILED DESCRIPTION OF PREFERRED EMBODIMENTS OF THE INVENTION

Figure 1:
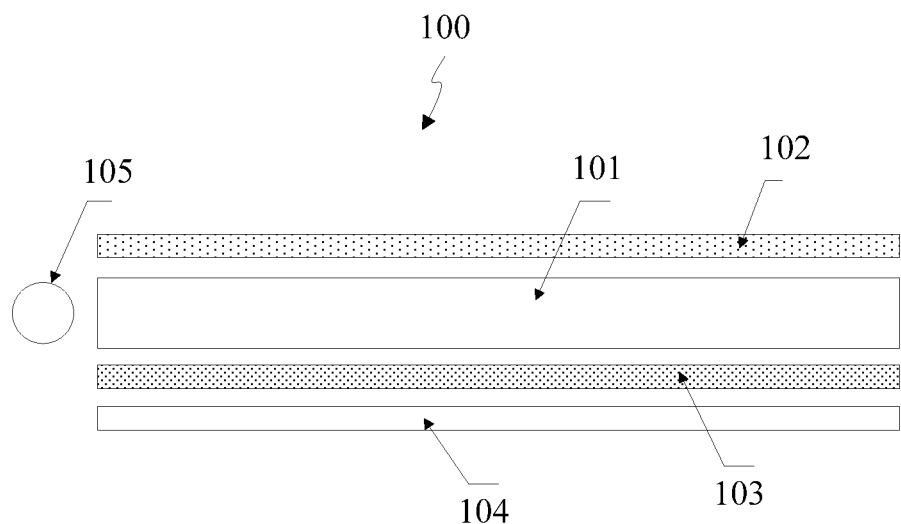
FIG. 1 is a schematic structural diagram showing a backlight module in prior arts.

Exemplary embodiments of the present invention will be described hereinafter in detail with reference to the attached drawings, wherein the like reference numerals refer to the like elements. The present invention may, however, be embodied in many different forms and should not be construed as being limited to the embodiment set forth herein; rather, these embodiments are provided so that the present invention will be thorough and complete, and will fully convey the concept of the disclosure to those skilled in the art.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Further, it should be noted that terms "first" or "second" used herein are merely used to distinguish elements from each other, but not interpreted as any difference in time or structure. Thus, an element indicated herein by "first" or "second" may also be indicated by "second" or "first" interchangeably, which will not result in a change in technical solutions and still falls within scopes of the present invention.

Figure 2:
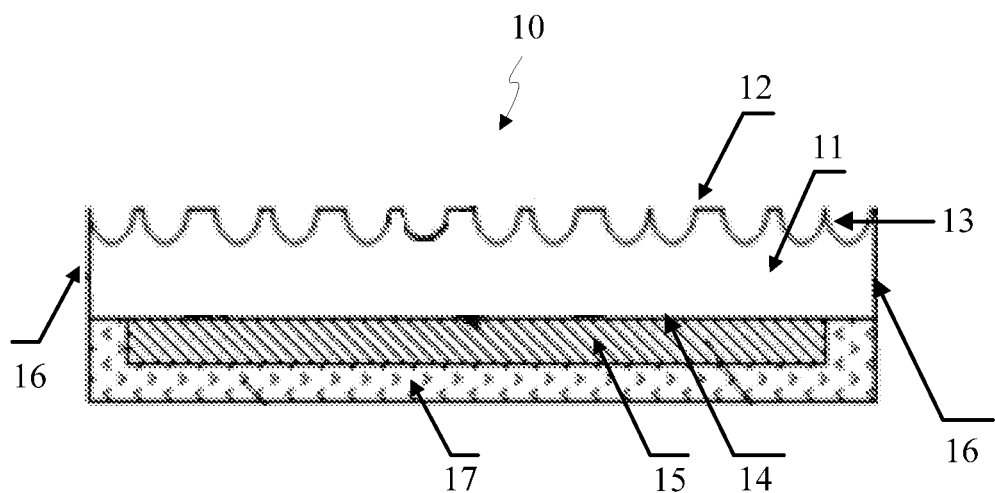
FIG. 2 is a schematic structural diagram showing a light guide plate according to a first embodiment of the present invention.

With reference to FIG. 2, a first embodiment of the present invention provides a light guide plate 10, comprising: a transparent substrate 11 having a light emergence face 12, a bottom face 14 opposite to the light emergence face 12, and a plurality of side faces 16 connecting and perpendicular to the light emergence face 12 and the bottom face 14; a scattering layer 13 formed on the light emergence face 12 of the transparent substrate 11; and a first reflective film layer 15 formed on the bottom face 14 of the transparent substrate 11. The transparent substrate 11 may be a substrate having a high rigidity, such as a glass substrate or a polymethylmethacrylate (PMMA) substrate having a high strength.

This embodiment provides following advantageous effects: by forming the scattering layer on the light emergence face of the rigid transparent substrate, and forming the first reflective film layer on the bottom face of the transparent substrate opposite to the light emergence face, when applying the light guide plate to a backlight module, parts such as a reflective sheet, an optical film sheet, a protective plate and the like may be omitted, thereby reducing the number of parts constituting the backlight module, simplifying the structure of the backlight module, reducing production costs and the thickness of the backlight module.

In an alternative embodiment of the present invention, an antioxidation film layer 17 is further formed on the first reflective film layer 15 to protect the first reflective film layer 15.

In an alternative embodiment of the present invention, the scattering layer 13 comprises a plurality of protrusions distributed over the light emergence face and having a size between 5 nm and 100 nm. The protrusions having a size in order of nanometer are formed by etching a surface of the transparent substrate 11 and function well in light scattering.

In an alternative embodiment of the present invention, a material of the first reflective film layer 15 is silver or aluminum.

In an alternative embodiment of the present invention, a material of the antioxidation film layer 17 is resin, $SiO_2$ or $SiN_x$. The antioxidation film layer 17 may be formed through a sputtering process.

Figure 3:
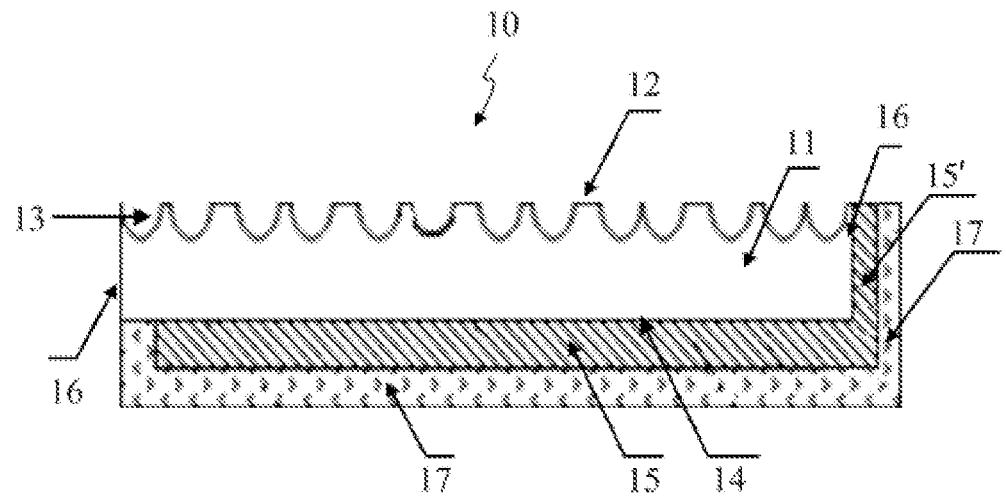
FIG. 3 is a schematic structural diagram showing a light guide plate according to a second embodiment of the present invention.

With reference to FIG. 3, there is shown a schematic structural diagram of a light guide plate according to a second embodiment. It should be appreciated by those skilled in the art that it is generally required that the light guide plate 10 is provided with a light incidence face. In this embodiment, any one of the plurality of side faces 16 of the transparent substrate 11, which connect and are perpendicular to the light emergence face 12 and the bottom face 14, may be selected as the light incidence face. With reference to the light guide plate 10 shown in FIG. 2, if light is incident into one side face 16, light may emerge from other side faces 16, resulting in light loss. Therefore, according to the present embodiment, on basis of the structure of the light guide plate according to the first embodiment of the present invention shown in FIG. 2, a second reflective film layer 15' is formed on at least one side face 16 of the plurality of side face 16 except the light incidence face, thereby reducing light loss. In an alternative embodiment of the present invention, an antioxidation film layer 17 is formed on the second reflective film layer 15'.

In an alternative embodiment of the present invention, a material of the second reflective film layer 15' is silver or aluminum.

In an alternative embodiment of the present invention, a material of the antioxidation film layer 17 is resin, $SiO_2$ or $SiN_x$. The antioxidation film layer 17 may be formed through a sputtering process.

Figure 4:
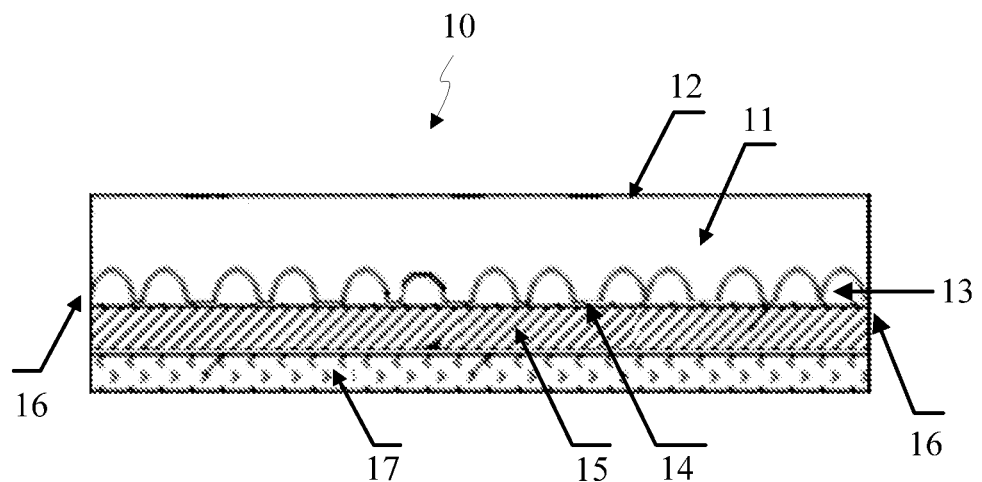
FIG. 4 is a schematic structural diagram showing a light guide plate according to a third embodiment of the present invention.

With reference to FIG. 4, there is shown a schematic structural diagram of a light guide plate according to a third embodiment. Specifically, this embodiment provides a light guide plate 10, comprising: a transparent substrate 11 having a light emergence face 12, a bottom face 14 opposite to the light emergence face 12, and a plurality of side faces 16 connecting and perpendicular to the light emergence face 12 and the bottom face 14; a scattering layer 13 formed on the bottom face 14 of the transparent substrate 11; and a first reflective film layer 15 formed on the scattering layer 13. In order to ensure strength of the light guide plate 10, the transparent substrate 11 may be a glass substrate or a polymethylmethacrylate (PMMA) substrate having a high strength.

In an alternative embodiment of the present invention, an antioxidation film layer 17 is further formed on the first reflective film layer 15 to protect the first reflective film layer 15.

In an alternative embodiment of the present invention, the scattering layer 13 comprises a plurality of protrusions distributed over the light emergence face and having a size between 5 nm and 100 nm. The protrusions having a size in order of nanometer are formed by etching a surface of the transparent substrate 11 and function well in light scattering.

In an alternative embodiment of the present invention, a material of the first reflective film layer 15 is silver or aluminum.

In an alternative embodiment of the present invention, a material of the antioxidation film layer 17 is resin, $SiO_2$ or $SiN_x$. The antioxidation film layer 17 may be formed through a sputtering process.

This embodiment provides following advantageous effects: by forming the scattering layer on the bottom face of the rigid transparent substrate, and forming the first reflective film layer on the scattering layer, when applying the light guide plate to a backlight module, parts such as a reflective sheet, an optical film sheet, a protective plate and the like may be omitted, thereby reducing the number of parts constituting the backlight module, simplifying the structure of the backlight module, reducing production costs and the thickness of the backlight module.

Figure 5:
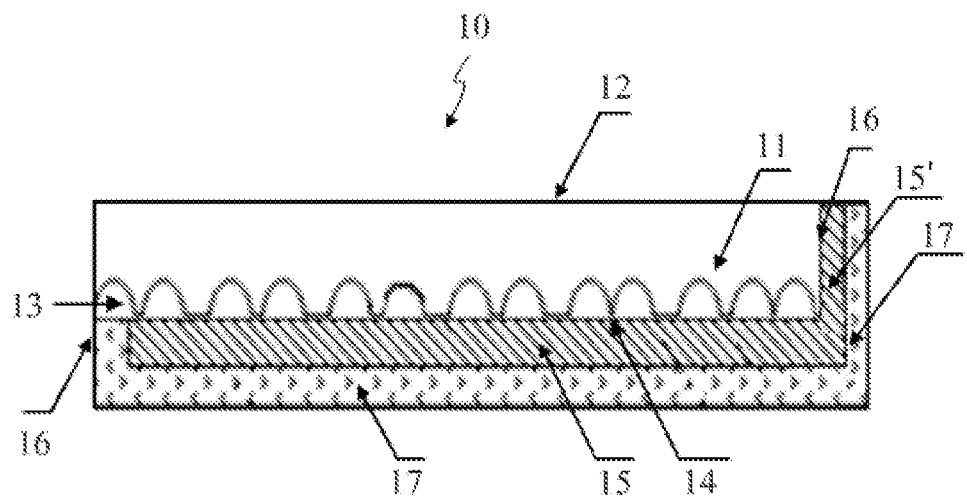
FIG. 5 is a schematic structural diagram showing a light guide plate according to a fourth embodiment of the present invention.

With reference to FIG. 5, there is shown a schematic structural diagram of a light guide plate according to a fourth embodiment. It should be appreciated by those skilled in the art that it is generally required that the light guide plate 10 is provided with a light incidence face. In this embodiment, any one of the plurality of side faces 16 of the transparent substrate 11, which connect and are perpendicular to the light emergence face 12 and the bottom face 14, may be selected as the light incidence face. With reference to the light guide plate 10 shown in FIG. 4, if light is incident into one side face 16, light may emerge from other side faces 16, resulting in light loss. Therefore, according to the present embodiment, on basis of the structure of the light guide plate according to the third embodiment of the present invention shown in FIG. 4, a second reflective film layer 15' is formed on at least one side face 16 of the plurality of side face 16 except the light incidence face, thereby reducing light loss. In an alternative embodiment of the present invention, an antioxidation film layer 17 is formed on the second reflective film layer 15'.

In an alternative embodiment of the present invention, a material of the second reflective film layer 15' is silver or aluminum.

In an alternative embodiment of the present invention, a material of the antioxidation film layer 17 is resin, $SiO_2$ or $SiN_x$. The antioxidation film layer 17 may be formed through a sputtering process.

In addition, embodiments of the present invention further provide a backlight module, comprising a light source (not shown) and the light guide plate as described above. In one embodiment, the light source is provided at a side of at least one side face of the plurality of side faces of the transparent substrate which is different from the side face on which the second reflective film layer 15' is located, and light emitted by the light source is incident into the light guide plate 10 from the at least one side face.

In one embodiment of the present invention, an incident angle of light emitted by the light source is set such that when the scattering layer 13 is formed on the bottom face 14 of the transparent substrate 11 and the first reflective film layer 15 is formed on the scattering layer 13, a part of light, which is incident from the at least one side face of the plurality of side faces 16 of the transparent substrate 11 directly to the light emergence face 12, will be totally reflected at the light emergence face 12. In other words, when the scattering layer 13 is formed on the bottom face 14 of the transparent substrate 11 and the first reflective film layer 15 is formed on the scattering layer 13, a part of light, which is incident from the at least one side face of the plurality of side faces 16 of the transparent substrate 11, will be incident to the scattering layer 13, reflected by the first reflective film layer 15, and finally emerge from the light emergence face 12, while other parts of the light will be incident to the light emergence face 12 directly. In order to prevent the other parts of the light from emerging from the light emergence face 12, an arrangement angle of the light source and thus the incident angle of light emitted by the light source are set so that light which is directly incident to the light emergence face 12 will be totally reflected at the light emergence face 12 back into the scattering layer 13, further reflected by the first reflective film layer 15, and finally emerge from the light emergence face 12. In one example of the present invention, when a glass substrate is used, since a refractive index of glass is about 1.5, the incident angle of light emitted by the light source may be set to be equal to or more than 45 degrees, so that light which is directly incident to the light emergence face 12 will be totally reflected one time at the light emergence face 12 without emerging directly.

As such, when applying the light guide plate to a backlight module, parts such as a reflective sheet, an optical film sheet, a protective plate and the like may be omitted, thereby reducing the number of parts constituting the backlight module, simplifying the structure of the backlight module, reducing production costs and the thickness of the backlight module.

Figure 6:
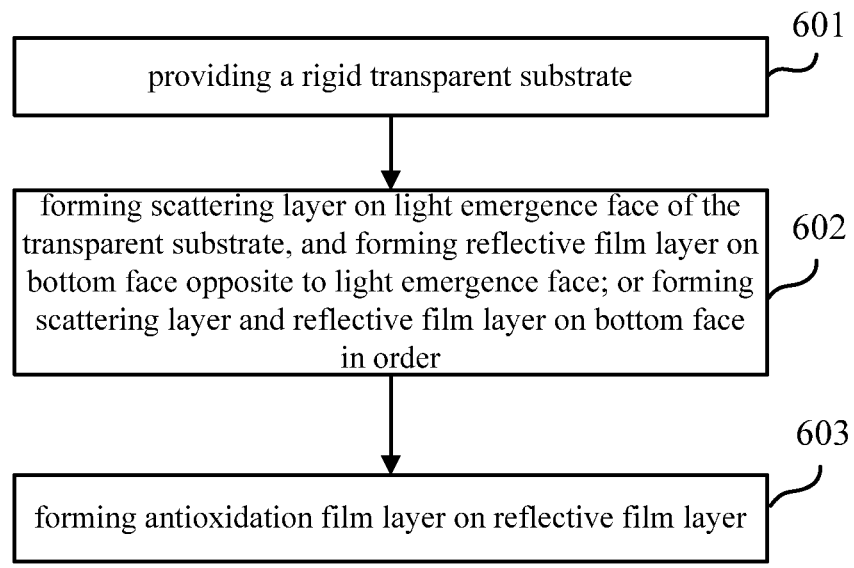
FIG. 6 is a flow chart showing a method of manufacturing a light guide plate according to embodiments of the present invention.

With reference to FIG. 6, embodiments of the present invention further provide a method of manufacturing a light guide plate, comprising steps of:

601: providing a transparent substrate 11, which has a light emergence face 12, a bottom face 14 opposite to the light emergence face 13, and a plurality of side faces 16 connecting and perpendicular to the light emergence face 12 and the bottom face 14. The transparent substrate may be a substrate formed of a material having a high rigidity.

602: forming a scattering layer 13 on the light emergence face 12 of the transparent substrate 11, and forming a first reflective film layer 15 on the bottom face 14; or, forming the scattering layer 13 on the bottom face 13, and forming the first reflective film layer 15 on the scattering layer 13.

In an alternative embodiment of the present invention, the step 602 of forming the scattering layer 13 on the light emergence face 12 of the transparent substrate 11 and forming the first reflective film layer 15 on the bottom face 14 comprises:

etching a plurality of protrusions, which have a size in order of nanometer, into the light emergence face 12 of the transparent substrate 11 so as to form the scattering layer 13; and depositing or evaporating a metal film on the bottom face 14 so as to form the first reflective film layer 15, or coating a non-metal film on the bottom face 14 so as to form the first reflective film layer 15.

In an alternative embodiment of the present invention, the step 602 of forming the scattering layer 13 on bottom face 14 and forming the first reflective film layer 15 on the scattering layer 13 comprises:

etching a plurality of protrusions, which have a size in order of nanometer, into the bottom face 14 of the transparent substrate 11 so as to form the scattering layer 13; and depositing or evaporating a metal film on the scattering layer 13 so as to form the first reflective film layer 15, or coating a non-metal film on the scattering layer 13 so as to form the first reflective film layer 15.

In an alternative embodiment of the present invention, the method further comprises a step of:

603: forming an antioxidation film layer 17 on the first reflective film layer 15.

It is noted that the step 602 only involves forming the first reflective film layer 15 on the light emergence face 12 or the bottom face 14. In order to reduce light loss, however, a step of forming reflective film layers on side faces may be included.

Figure 7:
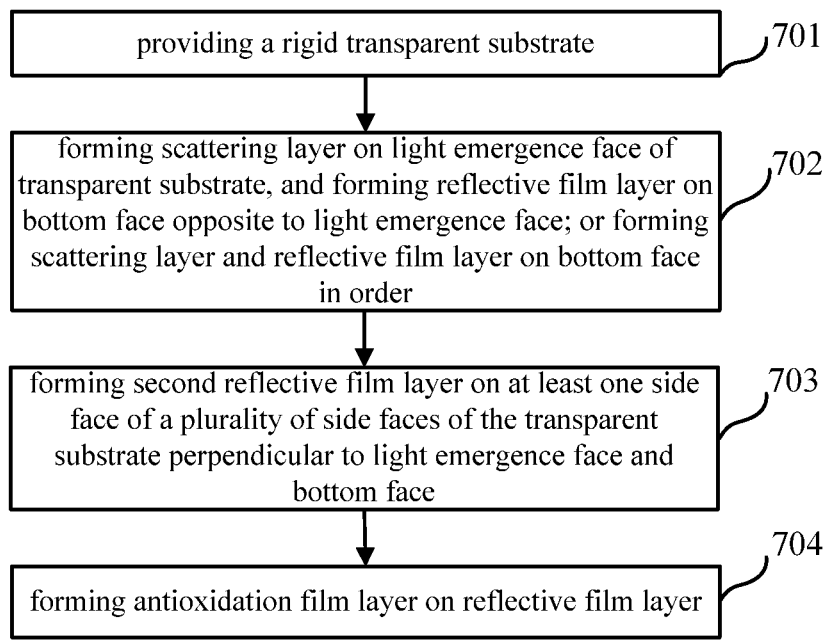
FIG. 7 is a flow chart showing another method of manufacturing a light guide plate according to embodiments of the present invention.

With reference to FIG. 7, there is provided another method of manufacturing a light guide plate, comprising steps of:

701: providing a rigid transparent substrate 11, which has a light emergence face 12, a bottom face 14 opposite to the light emergence face 13, and a plurality of side faces 16 connecting and perpendicular to the light emergence face 12 and the bottom face 14.

702: forming a scattering layer 13 on the light emergence face 12 of the transparent substrate 11, and forming a first reflective film layer 15 on the bottom face 14; or, forming the scattering layer 13 on the bottom face 13, and forming the first reflective film layer 15 on the scattering layer 13;

703: forming a second reflective film layer 15' on at least one side face (except for the side face into which the light from the light source is incident) of the plurality of side faces 16 of the transparent substrate 11.

704: forming an antioxidation film layer 17 on the first and second reflective film layers.

In an alternative embodiment of the present invention, the step 703 of forming a second reflective film layer 15' on at least one side face of the plurality of side faces 16 of the transparent substrate 11 comprises: depositing or evaporating a metal film on the at least one side face of the plurality of side faces 16 of the transparent substrate 11 so as to form the second reflective film layer 15', or coating a non-metal film on the at least one side face so as to form the second reflective film layer 15'.

It is noted that the above methods are only described with respect to manufacturing one light guide plate, however, those skilled in the art can understand that when forming the second reflective film layer and the antioxidation film layer on side faces of the light guide plate, the second reflective film layer and the antioxidation film layer may be formed on side faces of a plurality of light guide plates simultaneously. Specifically, after having formed the scattering layer on respective transparent substrates, formed the first reflective film layer on the bottom face or the scattering layer and formed the antioxidation film layer on the reflective film layer, the respective transparent substrates are stacked with each other, and then the second reflective film layer and the antioxidation film layer are formed on side faces of the transparent substrates simultaneously. In such a case, the reflective film layer and the antioxidation film layer formed between side faces of two adjacent transparent substrates may be etched by a acid solution so as to be separated, thereby completing the manufacturing of the light guide plate. For example, specific steps of the method may be described as follows.

The step of forming the second reflective film layer on the at least one side face of the plurality of side faces of the transparent substrate and the step of forming the antioxidation film layer on the second reflective film layer comprise:

stacking a plurality of the transparent substrates so that side faces of respective transparent substrates on which the second reflective film layers are to be formed are flushed with each other and located in the same plane;

depositing or evaporating a metal film on the side faces of the plurality of the transparent substrates, or coating a non-metal film on the side faces of the plurality of the transparent substrates;

forming the antioxidation film layer on the metal film or on the non-metal film by using a sputtering process;

introducing etchant from side faces of the transparent substrates on which the metal film or the non-metal film is not formed so as to etch off the metal film or the non-metal film between the respective transparent substrates; and etching off parts of the antioxidation film layer between adjacent transparent substrates by using a dry etching process, so that the respective transparent substrates are separated from each other, thereby forming the second reflective film layer and the antioxidation film layer on at least one side face of each of the respective transparent substrates, thereby completing the manufacturing of respective light guide plates.

In the present embodiment, a manufacturing efficiency may be improved by simultaneously forming the second reflective film layer and the antioxidation film layer on at least one side face of a plurality of transparent substrates.

Although several exemplary embodiments have been shown and described, it would be appreciated by those skilled in the art that various changes or modifications may be made in these embodiments without departing from the principle and spirit of the disclosure, the scope of which is defined in the claims and their equivalents.

What is claimed is:

1. A method of manufacturing a light guide plate, comprising steps of:
   providing a transparent substrate, which has a light emergence face, a bottom face opposite to the light emergence face, and a plurality of side faces connecting and perpendicular to the light emergence face and the bottom face; and
   forming a scattering layer on the light emergence face of the transparent substrate, and forming a first reflective film layer on the bottom face of the transparent substrate;
   wherein the step of forming the scattering layer on the light emergence face of the transparent substrate comprises etching a plurality of protrusions, which have a nanometer-order size, into the light emergence face of the transparent substrate so as to form the scattering layer; and
   wherein the method further comprises:
      forming a second reflective film layer on at least one side face of the plurality of side faces of the transparent substrate; and
      forming an antioxidation film layer on the first reflective film layer and the second reflective film layer; and
   wherein the step of forming the second reflective film layer on the at least one side face of the plurality of side faces of the transparent substrate and the step of forming the antioxidation film layer on the second reflective film layer are performed on a plurality of light guide plate simultaneously by:
      stacking a plurality of the transparent substrates so that side faces of respective transparent substrates on which the second reflective film layers are to be formed are flushed with each other and located in the same plane;
      depositing or evaporating a metal film on the side faces of the plurality of the transparent substrates, or coating a non-metal film on the side faces of the plurality of the transparent substrates;
      forming the antioxidation film layer on the metal film or on the non-metal film by using a sputtering process;
      introducing etchant from side faces of the transparent substrates on which the metal film or the non-metal film is not formed so as to etch off the metal film or the non-metal film between the respective transparent substrates; and
      etching off parts of the antioxidation film layer between adjacent transparent substrates by using a dry etching process, so that the respective transparent substrates are separated from each other, thereby forming the second reflective film layer and the antioxidation film layer on at least one side face of each of the respective transparent substrates.

* * * * *